(12) United States Patent
Economy et al.

(10) Patent No.: US 10,044,847 B2
(45) Date of Patent: Aug. 7, 2018

(54) POSITIONAL AWARENESS AND LOCATING SYSTEM FOR COGNITIVELY IMPAIRED INDIVIDUALS AND THEIR CAREGIVERS

(71) Applicant: DANIELLE'S BUDDY, INC., Allentown, PA (US)

(72) Inventors: Theodore F. Economy, Allentown, PA (US); John George Englesson, II, Center Valley, PA (US)

(73) Assignee: Lawrence P. Levitt, Allentown, PA (US)

( * ) Notice: Subject to any disclaimer, the term of this patent is extended or adjusted under 35 U.S.C. 154(b) by 0 days.

(21) Appl. No.: 15/301,739

(22) PCT Filed: Jul. 14, 2015

(86) PCT No.: PCT/US2015/040292
§ 371 (c)(1),
(2) Date: Oct. 4, 2016

(87) PCT Pub. No.: WO2016/014282
PCT Pub. Date: Jan. 28, 2016

(65) Prior Publication Data
US 2017/0142246 A1    May 18, 2017

Related U.S. Application Data

(60) Provisional application No. 62/027,358, filed on Jul. 22, 2014.

(51) Int. Cl.
*H04B 1/38* (2015.01)
*H04M 1/725* (2006.01)
(Continued)

(52) U.S. Cl.
CPC ........ *H04M 1/72527* (2013.01); *H04B 1/385* (2013.01); *H04L 67/02* (2013.01);
(Continued)

(58) Field of Classification Search
CPC .......... H04M 1/72527; H04M 1/72588; H04B 1/385; H04L 67/02; H04L 67/26; H04L 67/306; H04W 4/008; H04W 4/025
(Continued)

(56) References Cited

U.S. PATENT DOCUMENTS

| 9,002,372 B2 * | 4/2015 | Shakespeare ......... H04W 64/00 340/539.13 |
| 2008/0004904 A1 | 1/2008 | Tran |

(Continued)

OTHER PUBLICATIONS

International Search Report for corresponding application PCT/US2015/040292 dated Oct. 6, 2015.

*Primary Examiner* — Lee Nguyen
(74) *Attorney, Agent, or Firm* — Norris McLaughlin & Marcus P.A.

(57) ABSTRACT

An apparatus and system for minimizing the risk that a cognitively impaired individual will wander or elope, and for locating the individual in case he or she nonetheless successfully wanders or elopes. The system employs a wearable appliance which the cognitively impaired individual should not be able to remove easily. The system also employs a smartphone having an application for use by a care giver. A website and cloud server are employed for communication of data from the wearable appliance to the smartphone and from the smartphone to the website. In an optional embodiment, the smartphone can initiate notifications to other smartphones held by other individuals who can assist in the search.

6 Claims, 5 Drawing Sheets

(51) Int. Cl.
  *H04B 1/3827*  (2015.01)
  *H04W 4/02*  (2018.01)
  *H04L 29/08*  (2006.01)
  *H04W 4/00*  (2018.01)
  *H04W 4/80*  (2018.01)
  *H04M 1/00*  (2006.01)

(52) U.S. Cl.
  CPC ............ *H04L 67/26* (2013.01); *H04L 67/306* (2013.01); *H04M 1/72588* (2013.01); *H04W 4/008* (2013.01); *H04W 4/025* (2013.01); *H04W 4/80* (2018.02)

(58) Field of Classification Search
  USPC ............................................ 455/456.1–456.3
  See application file for complete search history.

(56) References Cited

U.S. PATENT DOCUMENTS

| | | |
|---|---|---|
| 2010/0016745 A1 | 1/2010 | Crump et al. |
| 2012/0223834 A1* | 9/2012 | Hyatt ................ G08B 21/0247 340/539.13 |
| 2013/0285836 A1 | 10/2013 | Proud |

* cited by examiner

POSITIONAL AWARENESS AND LOCATING SYSTEM FOR COGNITIVELY IMPAIRED INDIVIDUALS AND THEIR CAREGIVERS

BACKGROUND OF THE INVENTION

Field of the Invention

The present invention has to do with a four module system (referred to herein as the "System") for monitoring the location of autistic children, Alzheimer's Disease afflicted adults and others who may be cognitively impaired in order to prevent them from wandering or if they do wander and become lost, to recover them rapidly. The System is comprised of the following major sub systems:
1. Cloud Server/Website
2. Smartphone Application
3. Wearable Appliance
4. Wearable Mounting system

The Related Art

Autism is a complex neurological disorder whose features include reduced social behaviors, various impairments and developmental language and communication skills combined with, repetitive behaviors. The disorder covers a large range of symptoms, skills, and levels of impairment commonly referred to as the autism spectrum. Symptoms can range in severity from a handicap that limits an otherwise normal life, to a devastating disability that may require institutional care.

Children with autism have trouble communicating and interacting in a typical social manor. They have trouble understanding what other people say, think and feel. Most important to this application, children with autism have a strong propensity to wander or elope, often seeking out bodies of water and sometimes drowning or injuring themselves.

Alzheimer's Disease (AD), sometimes referred to as Alzheimer disease, or simply Alzheimer's, accounts for 60% to 70% of cases of dementia. It is a chronic neurodegenerative disease whose symptoms typically begin gradually and slowly get worse over time. The most common early symptom is short term memory loss characterized by difficulty in remembering recent events and as the disease progresses, symptoms can include problems with orientation, communication, mood swings, lack of motivation, poorly managed self care, and behavioral abnormalities. Additionally, as with individuals afflicted with autism, Alzheimer's patients have a propensity to elope or wander, getting lost and subjecting themselves to various dangers.

With the advent of sophisticated global positioning satellite ("GPS") technology and smartphones, there is no shortage of locating technologies for children, pets, packages, house arrest prisoners, and adults, each with some special features for that particular group. The technologies fall into several major categories as follows:

Child GPS locator by Brickhouse transmits the GPS coordinates to a smartphone and plots the position on a map. This device also can track the movements of an individual over time. It only works where there is access to satellite signals, i.e. outdoors. The device is available from Brickhouse Security, 980 Avenue of the Americas, 3rd Floor, New York, N.Y. 10018, http://www.brickhousesecurity.com/category/gps+tracking.do?nType=1

Wireless locator devices use a specialized radio direction finder receiver to locate the wearable device within a few hundred feet. Such devices are available from Nationwide Medical Incorporated, 28632 Roadside Drive, Suite 210, Agoura Hills, Calif., 91301, http://www.nationwidemedical.com.

Cell phone locators require proximity to cell towers to triangulate a rough position to the wearable or carried cell phone. This type of device is available from Verizon Wireless, www.verizonwireless.com.

"Mommy I'm Here" sound signal incorporates a small transmitter that activates an audible signal allowing the caregiver to locate the wearer as long as they are within earshot. This device is available from Mommy I'm Here, 4135 Blackhawk Plaza Circle, Suite 280, Danville, Calif. 94506 http://www.mommyimhere.com.

Special police band emergency service uses a special police band ultra-high frequency ("UHF") radio signal on the wearable device to allow a radio direction finder used by the authorities to find the lost person. The office of emergency personnel must be called and an official search implemented. These devices are available from EmFinders, http://www.emfinders.com.

eTrak is a device that sends a set of geographical (latitude and longitude) coordinates when a child leaves a particular area or safety zone. The product is available from: eTrak Corporation, 8235 Douglas Ave. Suite #910, Dallas, Tex. 75225, infoetrak.com.

Each of the above technologies has advantages and disadvantages. In most cases the technologies available are in a sense looking for a problem to solve, rather than being an engineered solution to a specific problem such as a lost autistic child or Alzheimer's patient. As a result, few parents of autistic children have or use these products despite the near constant fear of losing their child in a crowd. Focus groups have reported the reasons for this, and they include cost, both up front and monthly, size, battery life, and ability to locate the child indoors as well as outdoors. There also appear to be several physical versions needed depending on where on the spectrum each child is, as well as the age and gender of the child, although the majority of autistic children are male.

Examples of the art in each of the respective technological areas are as follows:

U.S. Pat. No. 5,485,163 to Singer et al. describes the use of a cellular network to locate a person by sending the coordinates of the receiving node to an authorized user. It does not describe the use of a GPS signal.

U.S. Pat. No. 5,583,914 to Change et al. teaches a method for optimizing a transmission signal path utilizing GPS locating technology.

U.S. Pat. No. 5,572,204 to Timm et al. discloses a method for providing roadside assistance to a stranded vehicle utilizing a GPS locating signal.

U.S. Pat. No. 5,021,794 to Lawrence provides a method of using an UHF homing signal on a wearable device to allow authorities to track and find a lost individual.

U.S. Pat. No. 5,731,757 to Layson, et al. describes a body worn device to track convicts on house arrest and uses both GPS and a wireless link with a base station to keep track of an individual.

U.S. Pat. No. 5,742,233 to Hoffman, et al, describes a wearable device which, when activated by the user, transmits a distress signal as well as the GPS location of the individual.

U.S. Pat. No. 6,075,442 to Welch discloses a wearable device used to generate a radio frequency ("RF") signal that can be located in both distance and direction by a specialized radio direction finding receiver carried by the caregiver to find the individual assumed to be nearby.

U.S. Pat. No. 7,511,627 to Holoyda describes a locating device with the addition of a series of distance thresholds with alarms if the wearer goes beyond a certain boundary area. It also utilizes a radio direction finding receiver carried by the caregiver to vector in on the location of the wearable device.

More recently, U.S. Pat. No. 9,002,372 to Shakespeare et al. describes an apparatus and system for locating lost persons whether they are indoors or outdoors.

For the purposes of this patent application we will use the term cognitively impaired to mean autistic individuals, Alzheimer's afflicted adults and others who in any way may have a cognitive impairment.

SUMMARY OF INVENTION

In order to minimize the risk that a cognitively impaired individual will wander or elope the system provides capabilities to assist the cognitively impaired individual's caregiver(s) to more effectively pay attention to the person in their charge(s) physical position relative to the caregiver. This goal is achieved through an application that runs on the caregivers smartphone that communicates with the wearable appliance that is secured to the impaired individual. The four modules function in coordination with one another to provide and facilitate paying better attention to, augmentation of and supplementation to the care giver's awareness of the impaired individual in order to prevent wandering. The modules additionally function in coordination with one another to provide location capability, as well as augmentation and supplementation of, through the smartphone application, the caregiver's inherent sense. If a cognitively impaired individual does manage to wander or elope, the System provides the capabilities to locate the individual quickly and effectively.

DESCRIPTION OF THE PREFERRED EMBODIMENTS

Figure 1:
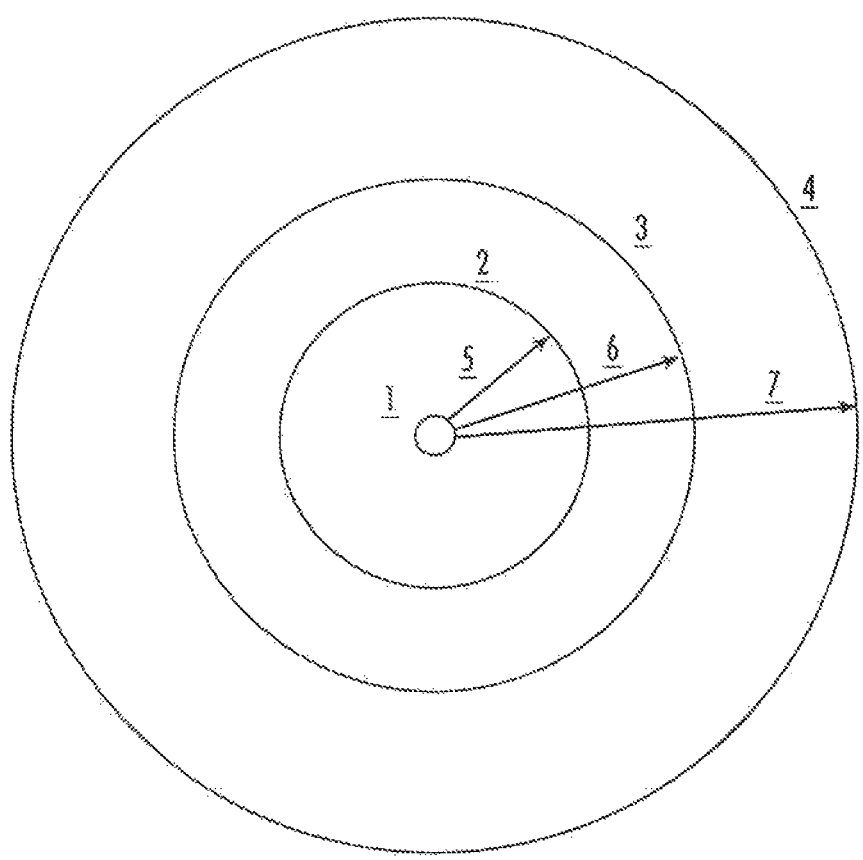
FIG. 1—Diagram of Various RF Usages
FIG. 2—Bluetooth Setup Mode
FIG. 3—Wi-Fi Access Point Mode
FIG. 4—Home Operation
FIG. 5—Away Operation Of course, the System of the invention can be used for other purposes, such as positional awareness and locating of pets, packages, or children and adults who are not cognitively impaired but may be in a theme park or shopping mall.

The various System Modules include:
1. Cloud Server/Website Functionality
2. Cellular System
3. Wi-Fi
4. GPS System
5. Wearable Appliance
6. Bluetooth
7. Smartphone Application, Wearable Appliance The wearable appliance 5 is electronically tethered to a caregiver's smartphone via Received Signal Strength Indicator (RSSI) values for Bluetooth (primary short range tether) and Wi-Fi (secondary mid range tether). When the electronic tether is "broken" the wearable appliance 5 enters the Elope Event Mode and communicates with a website via Wi-Fi connectivity, if available, or cellular data web service calls, transmitting location data, as well as other relevant information. Additionally, if the wearable appliance is unable to connect to a known Wi-Fi Access Point, it switches to Access Point Mode thereby establishing a secondary medium range electronic tether as well as functioning as a locating beacon to assist further in the acquisition of the cognitively impaired individual's location.

Once the location data is received by the website, the data is pushed to the caregiver's smartphone via push notifications. Additionally, once the smartphone detects that the electronic tether is broken it also enters its own Elope Event Mode. Specifically it additionally establishes a link with the website and pulls location data of the eloper. The smartphone can initiate push notifications to other "friends and family" and "Community Search" members to assist in locating the eloper.

The purpose of the integration of the various systems (cloud; app; smartphone and wearable appliance) with the various appliance technologies (primarily the entire spectrum of applicable RF technologies) in combination with the entire spectrum of communications paradigms, allows for a unique and previously unimaginable capability to be deployed to both train caregivers to "pay better attention" and, should the caregiver fail at that, allow for a "faster, better and cheaper" recovery of the impaired individual(s) in their charge.

The Cloud Server/Website and its related functionality serve as the hub of the System. The website and its related functionality receive and store location as well as other relevant data from the wearable appliance and smartphone application and smartphone(s). It then processes that information as well as store and use it in algorithms and transmit either back to appliance, smartphone app and smartphone(s). The website and related systems consume, and intelligently analyze the received data and act accordingly as defined by well-documented functional procedures. In other words, a primary design philosophy is to keep the "intelligence" at the website level. This philosophy allows for the most intelligent and dynamic usage of the received data while minimizing the wearable appliance's processing duties and thus keeps power consumption to a minimum.

The elements of the website's foreground functionality are described below.
1. Allows for caregiver member(s) sign up and registration of appliance.
2. Allows caregiver member(s) to setup a secure profile containing photos, and relevant information about their child, such as medical condition and medical history.
3. Allows for caregiver member(s) to setup a "Friends and Family Network" that can be activated in a number of variously defined conditions including but not limited to the condition of an Elope Event to assist in the location of a wandering individual. In other words, the caregiver can identify other individuals who can have access to the website and assist the caregiver in locating the cognitively impaired individual.
4. All data transmission will occur via secure socket layer, a secure communications protocol for Internet based data transfer.
5. Dashboard functionality provides website access to instantaneous and historical appliance and smartphone(s) location, battery life, communication capabilities, and other important System status values.
6. A full complement of web services support the operating process to provide inherent browser based functionality as well as, smartphone app and wearable appliance interface capability.
7. Integration of appliance location data into Google Maps Moving Map Application Programming Interface ("API") display (or any other similar Mapping API substitute for real-time display of appliance location from the Website.
8. Integration of location based services which employ local Wi-Fi Access Point RSSSI/MAC Address values to accurately determine location.
9. Provides monthly billing and/or accounting features for subscribers.
10. Provides the ability to purchase a System via the website.
11. Provides social media capabilities and interaction.

Cloud Server Architecture is the hub and primary intelligence of the system,
1. This architecture allows for the conservation of appliance and smartphone battery life. Note: The most important facet of battery life is upon elopement. Battery power consumption skyrockets during an Elope Event.
2. This architecture allows for more sophisticated logic development and algorithmic processing due to the high level of processing power at the cloud server (as opposed to the smartphone or app level).
3. This architecture allows for more easily modified, centrally located logic and algorithmic processing without having to modify software in the appliance or smartphone app thereby allowing them to be more "static".
4. This architecture allows for a highly scalable platform to support a large number of registered users and their associated functionality.

The Smartphone Application (App) is designed to function as the caregiver's primary daily interface mechanism to the System. The App is downloaded and installed on all of the devices that will be used in conjunction with the account. The account is created via the website. Optionally, the App allows the user to create the account via their smartphone. Upon registering, the System links the specific wearable appliance to the account by entering the appliances serial number (optionally by barcode scan of the appliance serial number). One appliance can be linked to the App at a time, or multiple appliances as well as multiple "wearers" of multiple appliances can be linked to the App. Upon linking an appliance to the system, the smartphone App begins the Bluetooth Low Energy (BLE) pairing process with the appliance. This is important since BLE serves as a local link to the appliance from the smartphone. Keeping in mind that the appliance does not have an embedded User Interface, the smartphone performs that function via BLE. During typical use the App creates a Primary BLE Electronic Tether with the appliance that it continually monitors. The electronic tether employs a collection of RF technologies to determine if the appliance and paired caregivers smartphone maintain a certain threshold distance. Once this distance is exceeded, the System (website, appliance, smartphone App, smartphone) automatically enters into Elope Event Mode where the primary goal is to determine the location of the appliance and thereby locate the wandering individual quickly and effectively.

The general characteristics of the smartphone application are as follows:
1. Employ Bluetooth capabilities for short-range interface and appliance programming capabilities as well as, Primary Electronic Tether.
2. Smartphone App actively manages all aspects of wearable appliance functionality
3. Smartphone functionality manages setup methodology to connect appliance to Selected Secured Wi-Fi Network and/or Bluetooth interface.
4. Electronic tether setup including range threshold value based on location and time.
5. Appliance dashboard functionality that gives smartphone instant access to battery life, communication capabilities, and other important system status values.
6. Setup and management of "friend's network" which is informed when an Elope Event Detection is sensed.
7. Integration of appliance location data into Moving Map display for real-time display of appliance location.
8. Smartphone algorithms and user interface are used for Multiple Smart devices to single wearable appliance triangulation.
9. Other smartphone algorithms and user interface are used for multiple smart devices to single appliance triangulation based stationary triangulation of two or more smart devices to one appliance.
10. Friends network activation when Elope Event is detected.
11. Community search activation when Elope Event is detected.
12. Battery warning indicator for smart device to ensure smart device is always adequately charged.
13. Smartphone battery charging management to optimize battery performance.
14. Smartphone App will have a panic button to trigger the appliance to enter elope mode and begin transmitting location data to the website.
15. Providing the capability to evolve functionality as situations dictate and more knowledge is obtained via specific uses of this technology to both not loose and locate, if lost, the cognitively impaired individual.
16. Crowd find Search Implementation.
17. Ability to unobtrusively and discreetly employ the network of enlisted users' smart devices to report RSSI of BLE and location data of eloper's appliance.
18. Conditioning of the caregiver to minimize elopement potential i.e. restricting phone calls, texts, distractions including caregiver smart device warning signaling tone change and severity (intensity) prior to elopement (as the wearer of the appliance is in the early stages of "taking off".

When the wearable appliance is worn (in some fashion) by the cognitively impaired individual, we refer to it as a wearable appliance. A wearable appliance can ultimately have a form factor equal to that of a wristwatch. The wearable appliance is water resistant as well as impact resistant. The internal case may be epoxy filled to provide these attributes. The appliance and wearable attachment mechanism is also quite robust as to prevent the appliance from being removed. If the appliance is removed, in one of the versions, it has the ability to sense this and communicate this information to the website module. The final wearable implementation will take on several embodiments.

Figure 2:
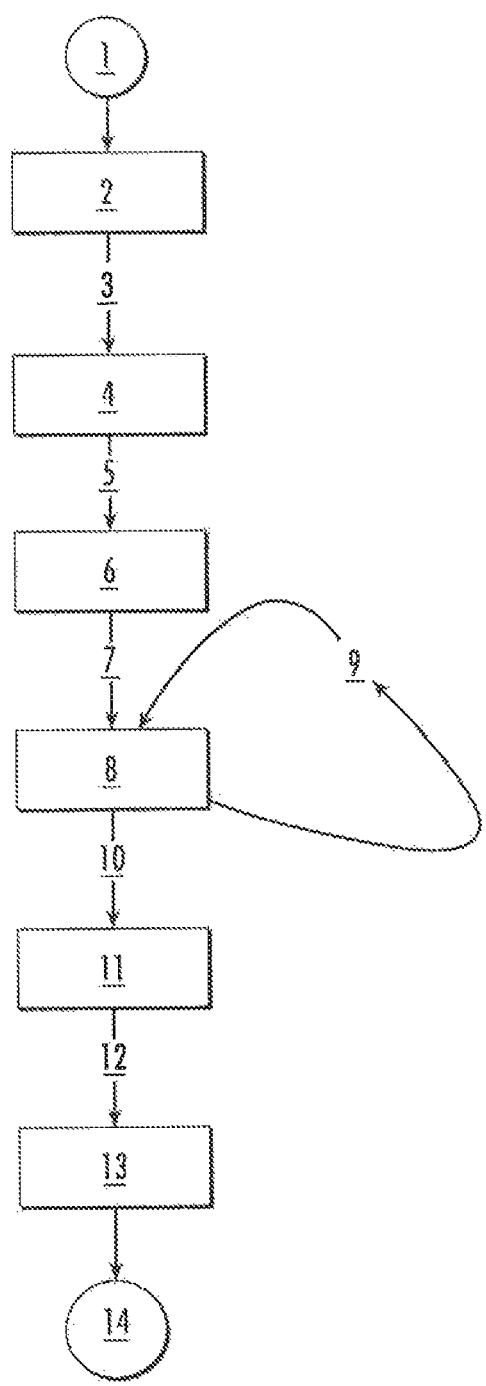

From an RF perspective the wearable appliance contains a diverse array of RF technologies onboard, including:
1. Wi-Fi
2. Bluetooth Low Energy (BLE)
3. Cellular (Code Division Multiple Access—"CDMA" or Global System for Mobile Communications—"GSM")
4. GPS Receiver FIG. 2 illustrates the interconnection between the various components on board the wearable appliance include:

1. Cellular Antenna
2. Cellular Modem Module
3. Integrated Wi-Fi and Bluetooth LE Module
4. Wi-Fi and Bluetooth LE Antenna
5. 9 Axis Gyro, Accelerometer, Compass
6. Micro Controller
7. Discrete Circuitry
8. GPS Antenna
9. GPS Module
10. Power Management
11. Battery Bluetooth Low Energy (BLE)—BLE serves as the primary electronic tether to the caregiver's smart device. BLE employs RSSI measurements for approximate distance from the caregiver's smart device. Additionally BLE is the primary local method of "programming" and interface to the appliance for actions such as Wi-Fi setup, parameter configuration, wearable condition i.e. battery life, etc.

Wi-Fi is used as the primary web interface, while a Wi-Fi internet connection is available to communicate with the website at a predetermined and configurable interval based on several input conditions. Wi-Fi is chosen to be the primary web interface for the wearable appliance and smartphone primarily for power management reasons. The appliance also measures and transmits RSSI data to determine an approximate distance from the home's Wi-Fi router as well as gathering MAC addresses (a unique identifier of network devices) and RSSI (Relative Signal Strength Indicator) of surrounding Wi-Fi networks and possibly cell towers. Additionally, if the wearable appliance is unable to connect to a known Wi-Fi Access Point, it switches to Access Point Mode, thereby establishing a secondary medium range electronic tether.

Wi-Fi Access Point Mode functions as a central connection point, which wireless clients such, as a smart device or computer, can connect to. This unique functionality allows the application running on the caregiver's smartphone to re-establish a connection with the appliance, in turn allowing the appliance to obtain connectivity via the caregiver's smartphone. This also allows for any smartphone, that is authorized and linked as part of the "Friends and Family"/"Community Search" configuration (as defined via the website) to assist in the location of the eloper. Each engaged smartphone transmits the appliance's RSSI value to the cloud server where triangulation will be performed to establish location. The location information is available through the smartphone application or browser to any authorized individual associated with the eloper's wearable appliance. The appliance also periodically programmatically exits from Wi-Fi Access Point Mode to collect nearby SSID and RSSI values to perform location based web service calls via cellular connectivity, as well as, search for known SSID's in an attempt to regain Wi-Fi internet connectivity.

Cellular (GSM or CDMA)—While in an Elope Event the appliance begins using a cellular connection to send relevant positional and additional data to the website where it is stored as well as, pushed back to the Caregiver's smartphone. Additionally, when Wi-Fi is not available the appliance relies on cellular technology for Internet connectivity. It should also be noted that the use of the cellular radio represents a proportionally large percentage of battery energy and therefore must be used sparingly and intelligently.

GPS Receiver—While only in an Elope Event mode and if location warrants, the appliance obtains GPS data that is transmitted to the website as a function of time. The use of Wi-Fi and cellular Location Based Services (LBS) is the primary locating mode providing greater positional location accuracy while in densely populated areas. Of primary consideration to the design of the appliance is power consumption and power management. Specifically, optimization of power reserves of the battery system. The wearable appliance, at all times, manages the power consumption of the appliance as well as measures instantaneous battery levels. If the battery level drops below a predetermined and configurable threshold, the wearable appliance enters a lower power mode and it initiates a web service call to the website to inform the system of its state. Additionally, under normal operations the wearable appliance periodically transmits battery status and other appliance information to the website depository.

The wearable appliance characteristics are summarized as follows: Combination and interoperability of four RF technologies and the use of LBS (Location Based Services) for positioning via Wi-Fi RSSI (Relative Signal Strength Indication) of localized SSID (Service Set Identification—Wi-Fi Hot-Spot/Access Point identifier) and the reconciliation of that with GPS as well as, native smartphone LBS.

1. On board Biotelemetry capabilities.
2. On Board 9-axis (Gyro (x, y, z)+Accelerometer (x, y, z)+Compass (x, y, z)) capabilities.
3. Capability to detect Δ of RSSI to provide movement detection.
4. In order to preserve battery life, higher processing functionality has been pushed to the cloud server.
5. Power management algorithms.
6. Ability to attach wearable between shoulder blades via a non-removable vest or bandolier.
7. Wristband implementation.
8. Ankle band implementation.
9. Belt implementation.
10. Wearable removal detection and system/caregiver alert capability.

Figure 3:
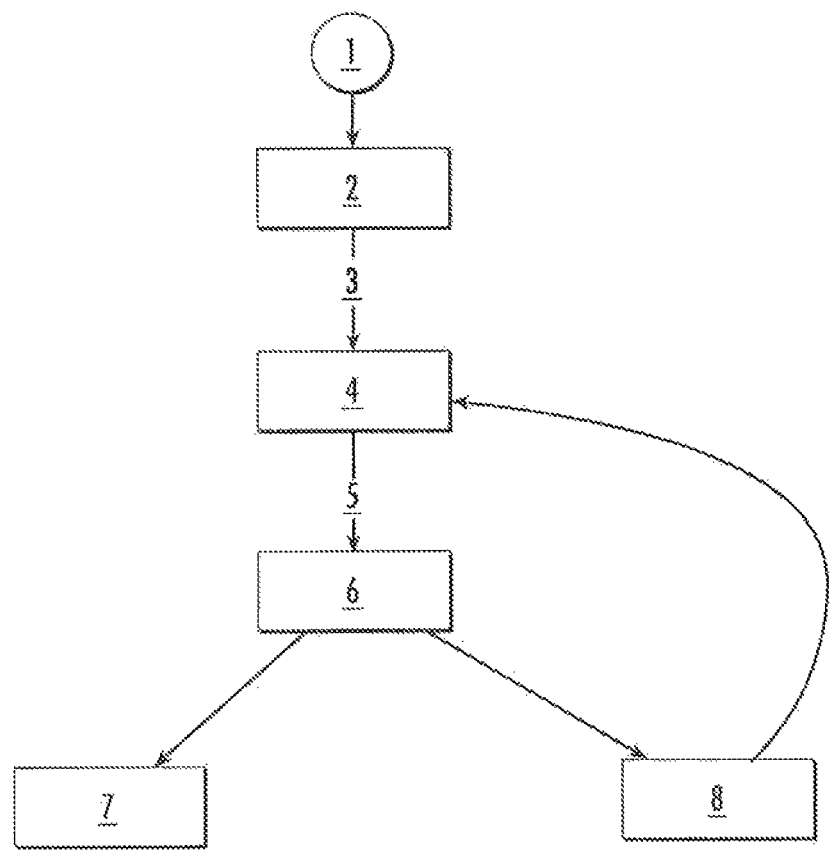
Figure 4:
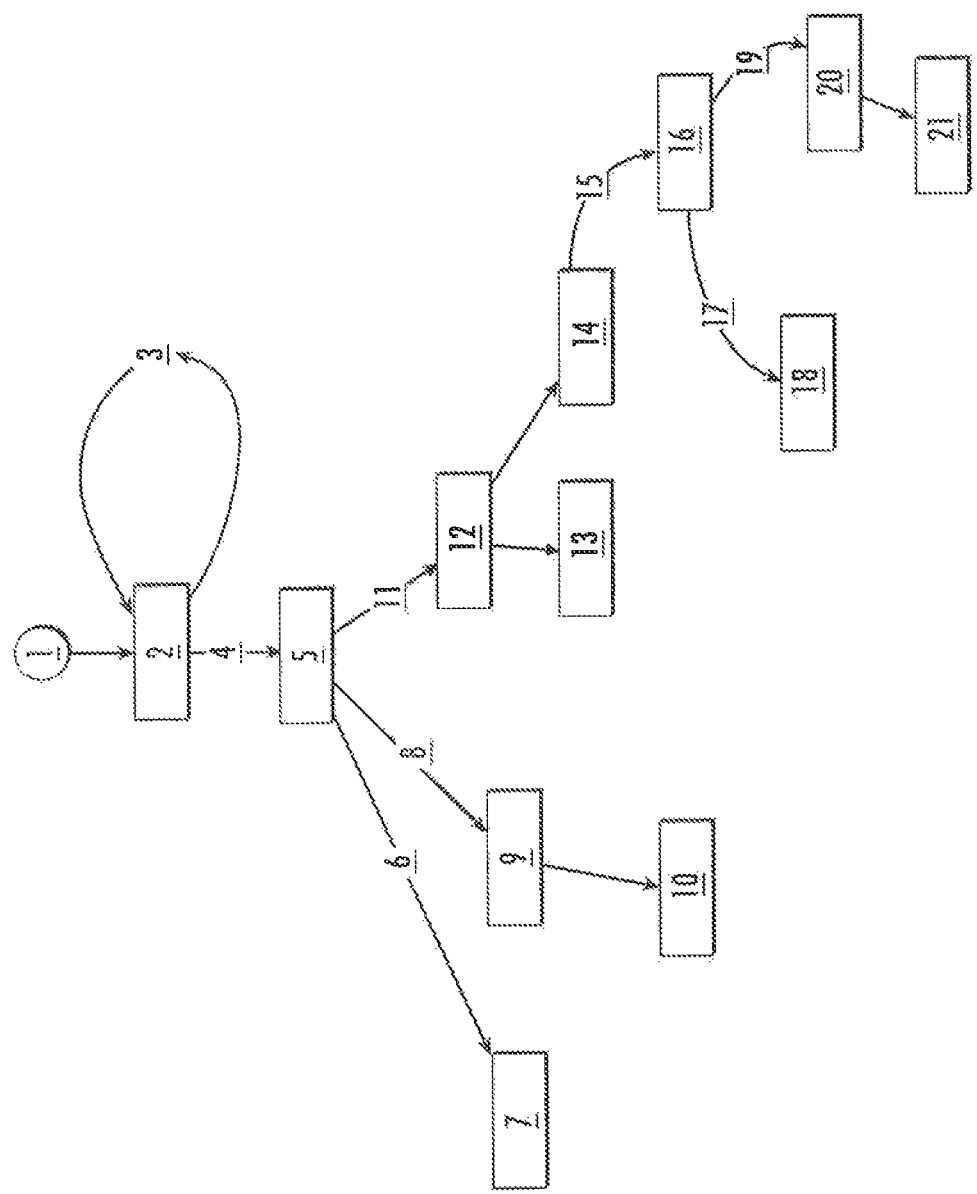

The numbered elements in the drawings are further identified as follows:

FIG. 1—RF Technology Range Diagram
1. Wearable Appliance
2. Bluetooth LE Range
3. Wi-Fi Range
4. Cellular Range
5. 150 Ft
6. 300 Ft
7. Limited by Cellular Range FIG. 2—Bluetooth Setup Mode
1. Start
2. New Wearable Appliance received
3. Access DBI Website
4. Wearable Appliance is registered
5. Access Smartphone Application "Store"
6. Smartphone Application is downloaded and functional
7. Smartphone Application enters Bluetooth discovery mode
8. Smartphone Bluetooth via App is searching for Wearable Appliance
9. Wearable Appliance Bluetooth not found
10. Wearable Appliance Bluetooth found
11. Bluetooth Connection not trusted
12. Smartphone Application accepts Wearable Appliance Bluetooth connection
13. Bluetooth trusted connection is established between Wearable Appliance and Smartphone Application. Primary electronic tether is created between Application and Wearable Appliance 14. Process complete FIG. 3—Wi-Fi Access Point Mode
1. Start
2. Smartphone Application is not connected to a known Access Point but is paired or tethered to Wearable Appliance via Bluetooth
3. Bluetooth Pair/Tether between Smartphone Application and Wearable Appliance is broken
4. Wearable Appliance enters into Wi-Fi Access Point Mode. Smartphones that have been previously associated and linked to the Wearable Appliance establish the secondary medium range electronic tether with the Wearable Appliance in Wi-Fi Access Point Mode
5. Associated Smartphones that are now linked to the Wearable Appliance transmit their location along with Wearable Appliances Wi-Fi RSSI values to Website/Cloud Server
6. Website/Cloud Server receives wearable applicant RSSI values and linked smartphone Applications Data and triangulates the location of the "lost" Wearable Appliance.
7. Wearable Appliance location is accessible via Associated Smartphone applications and authorized browser access
8. Wearable Appliance periodically edits AP mode and tests for known SSID and collects SSID/RSSI values for location based Service web calls FIG. 4—Home Operation
1. Start
2. Bluetooth is paired and Wi-Fi internet connection DOES exist
3. Bluetooth RSSI Period timer elapses (RSSI level indicates distance threshold NOT exceeded)
4. Bluetooth RSSI Period timer elapses (RSSI level indicates distance threshold HAS BEEN exceeded)
5. Primary Tether NOT connected (possible elope event state)
6. Push notification acknowledged by caregiver with Non elope Confirmation
7. Near Elope State
8. Push notification acknowledged by caregiver with Elope Confirmation
9. ELOPE EVENT STATE
10. Home Access Point Connection not Successful
11. Push notification timer times out and not acknowledged by caregiver
12. Elope Event State Entered—Wearable Appliance gathers current RSSI values of all nearby Wi-Fi Networks and makes geolocation Web Service call to Website Cloud Server to fix location and make system aware of location.
13. Wearable Appliance location fixed.
14. Wearable Appliance location NOT fixed
15. Turn on GPS
16. GPS in Wearable Appliance and attempt GPS FIX
17. Wi-Fi Internet connection Exists
18. Make web service call via Wi-Fi to Website Cloud Server to fix location and make system aware of location.
19. Wi-Fi Internet connection Does Not Exists
20. Cellular Modem is ON
21. Make web service call via Cellular Modem to Website Cloud Server to fix location and make system aware of location.

Figure 5:
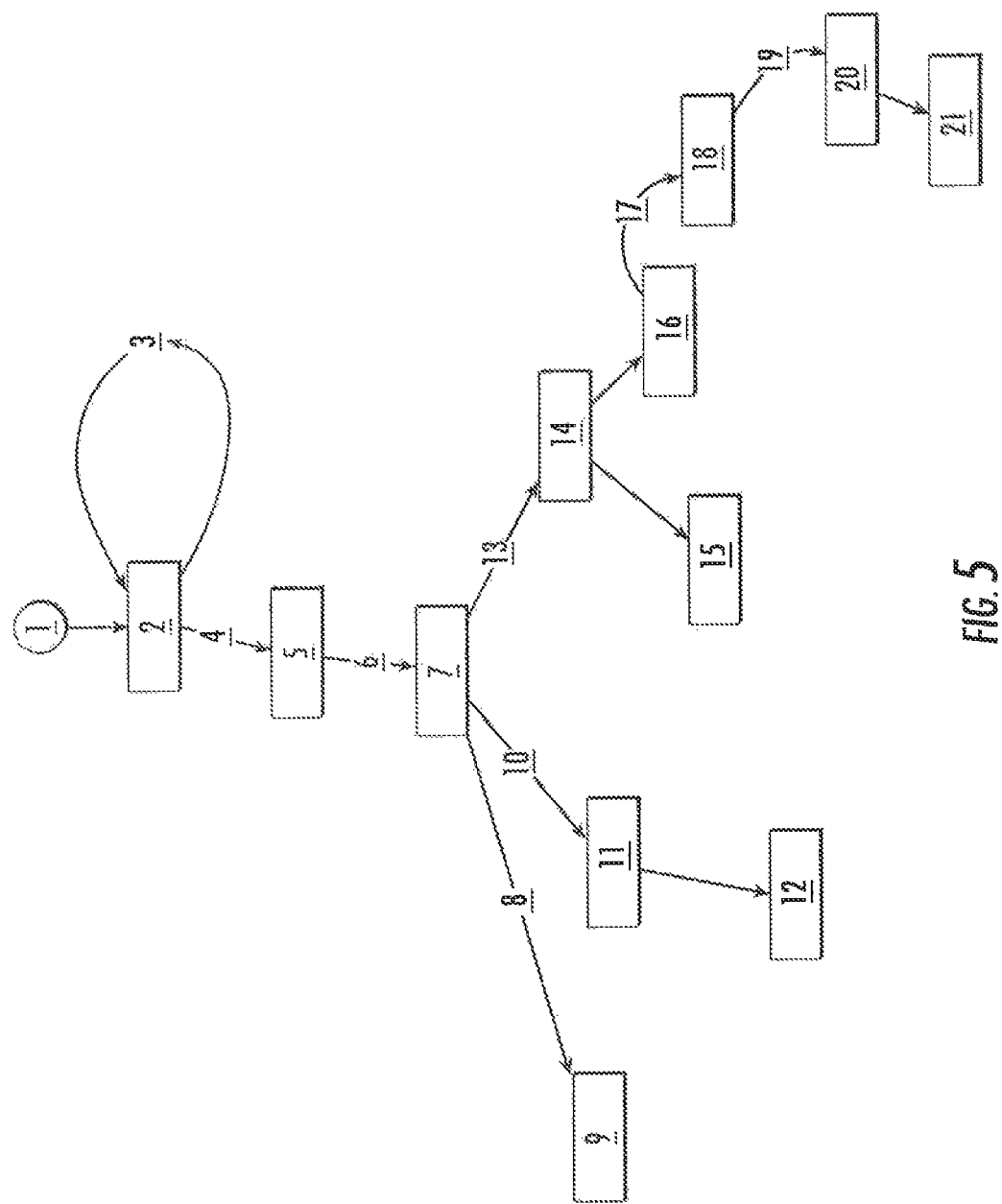

FIG. 5—Away Operation
1. Start
2. Bluetooth is paired and Wi-Fi Internet connection DOES NOT exist
3. Bluetooth RSSI Period timer elapses (RSSI level indicates distance threshold NOT exceeded)
4. Bluetooth RSSI Period timer elapses (RSSI level indicates distance threshold HAS BEEN exceeded)
5. Primary Tether Not connected (possible elope event state)
6. Enable Wearable Appliance in Access Point Mode and turn on Cellular Modem
7. Smartphone Application is connected to Wearable Appliance via Wearable Appliance's Access Point, Cellular radio is ON. Push Notification alert is sent to website cloud server and directly to care giver.
8. Push notification acknowledged by caregiver with Non elope Confirmation
9. Near Elope State
10. Push notification acknowledged by caregiver with Elope Confirmation
11. ELOPE EVENT STATE
12. Connection not successful; attempt reconnection
13. Push notification timer times out and Not acknowledged by caregiver
14. Elope Event State Entered—Wearable Appliance gathers current RSSI values of all nearby Wi-Fi Networks and makes geolocation Web Service call via cellular modem to Website Cloud Server to fix location and make system aware of location.
15. Wearable Appliance location is fixed
16. Wearable Appliance location is NOT fixed with geolocations service
17. Turn on GPS
18. GPs is on and attempt to acquire GPS fix
19. Wi-Fi Internet Connection does not exist
20. Cellular modem is ON
21. Make Web Service Call via cellular modem

What is claimed is:

1. A system for minimizing the risk that a cognitively impaired individual will wander or elope and for locating the individual in case he or she successfully wanders or elopes, the system comprising:

a wearable appliance, securable to the cognitively impaired individual, electronically tethered to a primary smartphone of a caregiver of the cognitively impaired individual via a plurality of electronic tethers comprising a first electronic tether limited by a first range, a second electronic tether limited by a second range and a third electronic tether limited by a third range, wherein the third range is greater than the first range and the second range, the second range is greater than the first range, Bluetooth connectivity establishes the first electronic tether, Wi-Fi connectivity establishes the second electronic tether and cellular connectivity establishes the third electronic tether, wherein a break in the first electronic tether causes the wearable appliance to communicate with a website by means of the Wi-Fi connectivity or the cellular connectivity thereby transmitting location data indicative of the present location of the wearable application to the website such that the transmitted location data is received by the website, the website is configured to then push the received location data to the primary smartphone by means of one or more push notifications, the pushed location data being integrated into a moving map application programming interface display for real-time display, via the primary smartphone, of the present location of the wearable appliance, the break in the first electronic tether also causes the primary smartphone to establish a link with the website and pull location data indicative of the present location of the wearable appliance and, optionally, the primary smartphone is configured to initiate push notifications to one or more secondary smartphones that are usable to assist in locating the wearable appliance, if the wearable appliance is unable to connect to a known Wi-Fi Access Point, then the wearable appliance is configured to switch to Access Point Mode thereby establishing the second electronic tether and functioning as a locating beacon to assist in acquisition of the present location of the wearable appliance, and, when the Wi-Fi connectivity is not available, the wearable appliance relies on the cellular connectivity for Internet connectivity to communicate with the website, and the website employs cloud server architecture and is configured to function as intelligence for dynamic usage of the received location data such that processing duties executed by the wearable appliance and the primary smartphone are minimized and battery power consumption by the wearable appliance and the primary smartphone is minimized.

2. The system of claim 1 wherein the website is configured to allow the caregiver to sign up and register the wearable appliance with the website, set up a secure profile of the cognitively impaired individual and set up a network of individuals that assist the caregiver in locating at least one selected from the wearable appliance and the cognitively impaired individual.

3. The system of claim 2 wherein the secure profile comprises at least one selected from photographs of the cognitively impaired individual, at least one medical condition of the cognitively impaired individual and a medical history of the cognitively impaired individual.

4. The system of claim 1 wherein the website is configured to provide access to instantaneous and historical locations of the primary smartphone and/or the wearable appliance, battery life of the primary smartphone and/or the wearable appliance, communication capabilities of the primary smartphone and/or the wearable appliance and/or other system status values.

5. A system for minimizing the risk that a cognitively impaired individual will wander or elope and for locating the individual in case he or she successfully wanders or elopes, the system comprising:

a wearable appliance, securable to the cognitively impaired individual, electronically tethered to a primary smartphone of a caregiver of the cognitively impaired individual via an electronic tether by means of received signal strength indicator values for Bluetooth as a primary short range tether and Wi-Fi or cellular data as a secondary mid-range tether, wherein a break in the electronic tether causes the wearable appliance to communicate with a website by means of Wi-Fi connectivity or cellular data web service calls thereby transmitting location data indicative of the present location of the wearable application to the website such that the transmitted location data is received by the website, the website is configured to then push the received location data to the primary smartphone by means of one or more push notifications, the pushed location data being integrated into a moving map application programming interface display for real-time display, via the primary smartphone, of the present location of the wearable appliance, the break in the electronic tether also causes the primary caregiver's smartphone to establish a link with the website and pull location data indicative of the present location of the wearable appliance and, optionally, the primary smartphone is configured to initiate push notifications to one or more secondary smartphones that are usable to assist in locating the wearable appliance, if the wearable appliance is unable to connect to a known Wi-Fi Access Point, then the wearable appliance is configured to switch to Access Point Mode thereby establishing a secondary medium range electronic tether and functioning as a locating beacon to assist in acquisition of the present location of the wearable appliance, and the website employs cloud server architecture and is configured to function as intelligence for dynamic usage of the received location data such that processing duties executed by the wearable appliance and the primary smartphone are minimized and battery power consumption by the wearable appliance and the primary smartphone is minimized, and further wherein a distance threshold value is based on a location and a time and is included in a setup of the electronic tether, and the electronic tether employs a plurality of RF technologies to determine if the electronically tethered wearable appliance and primary smartphone maintain the distance threshold value.

6. A method comprising:

electrically tethering a wearable appliance, securable to the cognitively impaired individual, to a primary smartphone of a caregiver of the cognitively impaired individual via a plurality of electronic tethers by means of received signal strength indicator values for Bluetooth as a primary short range electronic tether and WiFi as a secondary mid-range electronic tether;

communicating, via the wearable appliance when a break in the primary short range electronic tether occurs, with a website by means of Wi-Fi connectivity or cellular connectivity thereby transmitting location data indicative of the present location of the wearable application to the website such that the transmitted location data is received by the website;

pushing, via the website, the received location data to the primary smartphone by means of one or more push notifications;

integrating the pushed location data into a moving map application programming interface display for real-time display, via the primary smartphone, of the present location of the wearable appliance;

establishing a link between the website and the primary smartphone, when the break in the primary short range electronic tether occurs, and pulling the location data indicative of the present location of the wearable appliance from the website and, optionally, initiating, via the primary smartphone, push notifications to one or more secondary smartphones that are usable to assist in locating the wearable appliance;

switching the wearable appliance to Access Point Mode when the wearable appliance is unable to connect to a known Wi-Fi Access Point thereby establishing the secondary medium range electronic tether and functioning as a locating beacon to assist in acquisition of the present location of the wearable appliance; and determining if the electronically tethered wearable appliance and primary smartphone maintain a distance threshold value via the plurality of electronic tethers, wherein the distance threshold value is based on a location and a time and is included in a setup of the electronic tether, or establishing the primary short range electronic tether limited by a first range via Bluetooth connectivity, the secondary medium range electronic tether limited by a second range via Wi-Fi connectivity and a tertiary long range electronic tether limited by a third range via cellular connectivity, wherein the third range is greater than the first and second ranges and the second range is greater than the first range.

\* \* \* \* \*